United States Patent
Kalfhaus

[11] Patent Number: 5,991,166
[45] Date of Patent: Nov. 23, 1999

[54] SWITCHING POWER SUPPLY

[76] Inventor: Reinhard Kalfhaus, Jahnstrasse 2, 63533 Mainhausen, Germany

[21] Appl. No.: 08/862,764

[22] Filed: May 23, 1997

[51] Int. Cl.$^6$ .................................................. H02M 3/335
[52] U.S. Cl. ............................................... 363/16; 363/97
[58] Field of Search ................................ 363/16, 21, 97, 363/131

[56] References Cited

U.S. PATENT DOCUMENTS

| | | | |
|---|---|---|---|
| 5,115,185 | 5/1992 | Fraidlin et al. | 323/207 |
| 5,764,039 | 6/1998 | Choi et al. | 323/222 |
| 5,771,168 | 6/1998 | Liao et al. | 363/143 |

FOREIGN PATENT DOCUMENTS

| | | |
|---|---|---|
| 0 388 069 | 9/1990 | European Pat. Off. . |
| WO 92/15145 | 9/1992 | WIPO . |

OTHER PUBLICATIONS

Dixon, Lloyd, "High Power Factor Preregulator Using the SEPIC Converter", Unitrode Corp. pp. 6–1—6–12 (May 1993).
Liao, Chiawci, "Akkus Laden, Ohne zu Heizen", Electronik 23, pp. 94–98 (1995).
Electronic Design, pp. 78–84 (May 30, 1995).
Sebastian, J. et al., "Using SEPIC Topology for Improving Power Factor in Distributed Power Supply Systems", EPE Journal, vol. 3, No. 2, Jun. 1993, pp. 107–115.
Wen–Jian Gu et al., "Topologies and Characteristics of DC–DC Converters Using Class E Resonant Switch", Electronics and Communications in Japan, Part 1, vol. 75, No. 1, 1992 pp. 82–96.

*Primary Examiner*—Adolf Deneke Berhane
*Attorney, Agent, or Firm*—Ostrager Chong Flaherty & Onofrio, P.C.

[57] ABSTRACT

A switching power supply using SEPIC topology with an input and output circuit (12, 14). The input circuit (12) contains two inductance coils (D1.1) and (D1.2). To improve power supply and control properties, the second inductance coil (D1.2) is magnetically coupled to the first inductance coil (D1.1), in such a way that a value (IS), proportional to current (IS), measured in the second inductance coil (D1.2), can be supplied to a current regulator (KI) as an actual value. A computer unit (RG') contains an input (A) for a voltage difference (UF) from output voltage (UA) and reference voltage (USOLL), an input (B) for a sinusoidal input voltage (UE), and an additional input (C) for the peak value (UES) or a phased-shifted voltage (k×UES) of the input voltage as a direct voltage reading, whereby a signal $$D = A \times B / C = UF \times UE / k \times UES$$

is produced at output (52').

22 Claims, 7 Drawing Sheets

SWITCHING POWER SUPPLY

FIELD OF THE INVENTION

The invention relates generally to a switching power supply with improved power characteristics resulting from optimized PFC rating. More particularly, the invention relates to a PFC rated switching power supply for converting an input alternating current ("ac") into a controlled output current and for regenerating a fluctuating input voltage into a constant output voltage or constant output current.

BACKGROUND OF INVENTION

The state of the art mentions various types of switching devices used to improve power factor. Their aim is to reproduce the input voltage at the power supply input, and to keep the current in phase with the voltage. The full-wave rectified voltage in a 50 or 60 Hz power line fluctuates between 0 volt and a peak value, indicating that the supplied current value should also be sinusoidal between 0 A and a peak value.

A boost topology is used with a flow converter coupled in series or another converter topology with potential separation. This approach has the disadvantage of being chopped in two phases. Also, connecting two switching power supplies in series is both expensive and energy inefficient, as the inefficiencies of both power supplies are multiplied. Furthermore, the boost topology with an interconnected push-pull transformer phase employs a one-phase concept.

The state of the art also mentions another topology, SEPIC (single-ended primary inductance), which can transform upward from 0 volt (flux voltage) to any desired voltage.

The above mentioned switching topology attempts to replace the booster with SEPIC topology. Still, the negative aspect of the two stage concept remains. Another disadvantage of boost topologies is the susceptibility of the intermediate circuit condenser to short circuits, the switching configuration itself being prone to shorts.

There is also a known regulating concept for boost topology in which a direct current ("dc") intermediate circuit voltage is generated in the sinusoidal line by a voltage-regulating amplifier whose amplified voltage error differential is multiplied by the type of input voltage and divided by the square of the average input voltage. This figure is then used as the reference current value.

State of the art industrial, telecommunications, and on-board aircraft supply circuits are subject to secondary malfunctions. System users who work with these supply circuits not only have to take steps against these naturally occurring malfunctions (e.g., lightning) but also against those caused by other circuit users.

A significant shortcoming of almost all supply circuits are fluctuations in static rated input voltage of up to ±40% (EN50 155) or vehicles using 12V (24V) which disrupt on-board circuits by up to <6.5V (9.5V), depending on the type of power line or battery. The connected electronic systems or power supplies cannot handle these current fluctuations, resulting in malfunctions.

A particular problem of this type involves secure voltage supply for relays and contactors, and secure voltage supply for current-proportional hydraulic and pneumatic throttles and/or for blowers (known as loads). Since there is no guarantee that electro-mechanical switching components such as relays and contactors will switch or remain switched below a minimal input voltage due to their physical, magnet, and mechanical limits, fluctuations of supply voltage leads to malfunctions. The state of the art recommends monitoring supply voltages with monitoring switches. Reaction is impossible in emergency scenarios such as too low input voltage due to load disconnection, long leads, or less than ideal feed sources. Substantial improvements in contactors are being made to insure that they switch properly even with fluctuating input voltages. Still, these improvements involve substantial costs.

It is also a known fact that in a switched-on state, loads such as contactors can be operated at voltages higher than their rated voltages, resulting in substantial power loss. During power line over-voltage, contactors can be destroyed or their service life shortened. Intentionally or not, this would result in unpredictable changes in blower RPM and torque.

According to the state of the art, servo or AGC amplifiers are used to drive current proportional throttles. These amplifiers may be fed by power transformers and controlled linearly or chopped on a rated voltage UN. However, such solutions are extremely expensive. Also, when boosters are used, the output voltage cannot be set at or adjusted to the power line's rated voltage.

During transistor defects, step-down boosters are switched through to the input voltage at the output. For step-up boosters, cutting the input voltage creates a dynamic short circuit in the output condenser, and the circuit is not protected against shorts. EP 0 388 069 A2 describes a dc/dc converter switching circuit. Essentially, the converter consists of a ladder-like circuit structure in which the horizontal components include an inductance L1, a capacitance C2, and a diode D1, and the vertical components comprise a transistor S1, an inductance L2, and a capacitance C3. The circuit configuration is characterized by containing only one transistor connected to the circuit group, and the transistor requires only one control signal. The circuit configuration also requires no isolating transformer. The above contains no indications as to PFC rating or control behavior.

"Using SEPIC Topology for Improving Power Factor in Distributed Power Supply Systems" by J. Sebastián et al., in EPE Journal, vol. 3, no. 2, June 1993, describes the use of a PFC rated SEPIC topology as power supply system. A multiplication method is proposed to regulate PFC, while a voltage sequence method is suggested which can be applied in various operating phases (continuous control operation or intermittent dc flow). Especially in the multiplication method, a sinusoidal input voltage UE, an input current IE, and an output voltage UA are input into the regulator circuit as actual values. No rating or processing is provided for the output current IA. The input current IE fluctuates along with the input voltage, which has a lasting effect on regulation behavior. Further, the formula used to calculate PFC rating for (step-up) boosters is applied.

Another SEPIC topology can be found in Wen-Jian Gu, et al's article "Topologies and Characteristics of DC—DC Converters Using Class E Resonant Switch (sic)," Electronics and Communications in Japan, Part I, vol. 75, no. 1, 1992, pp. 82–96. PFC regulating circuits are not mentioned in this article as they relate to SEPIC topology.

SUMMARY OF INVENTION

The invention at hand deals with the problem of developing switching power supplies of the type described above with improved power characteristics resulting from optimized PFC rating.

Furthermore, a one-stage power switching supply should be provided which eliminates the above-mentioned disadvantages without entailing increased cost. The power switching supply should be short-circuit proof and easy to build. The power switching supply should also be able to supply constant output voltage under extreme fluctuations of input voltage, whereby output voltage is adjustable over a wide range.

In accordance with a first preferred embodiment of the invention, an input alternating current UE is converted to a controlled output voltage UA in an output circuit regulated with loads CA, RA and LA. The input circuit comprises a first inductance coil D1.1 connected in series with a condenser CS through a first joint. The condenser CS is connected through a second joint with the output circuit and a first pin of a second inductance coil D1.2. The second pin of the second inductance coil is connected to a third joint which is connected to both the output circuit and the input terminal via a lead. A power transistor T is placed between the first joint and the lead. The switching power supply further comprises a control circuit having a voltage regulator KU, a computer unit RG, RG' and a current regulator KI, in which the computer unit RG, RG' is connected in series to the voltage regulator KU to measure PFC in such a way that an output value D of the computer unit RG, RG' is available as the desired current value for the current regulator KI connected in series.

In accordance with a second preferred embodiment of the invention, a power regenerator or battery charger is provided to regenerate a fluctuating input voltage UE into a constant output voltage UA created across a load CA, RA, LA or across a constant output current IA. The power regenerator comprises a regulator circuit consisting of a voltage regulator KU and a current regulator KI. An input circuit comprises a first inductance coil D1.1 connected in series to a first joint which is connected in series with a condenser CS. The condenser CS is coupled with the load CA, RA, LA through a second joint and a diode DE. The load CA, RA, LA is connected to the input by a lead. A power transistor T is placed between the first joint and the lead, and a second inductance coil D1.2 is placed between the second joint and the lead.

The problem of the invention at hand is solved by the second inductance coil D1.2 being magnetically coupled to the first inductance coil D1.1, by providing the current regulator KI with a value $I_s$ proportional to the current IS measured in the second inductance coil D1.2 which can be supplied as an actual value, by the computer unit RG' having an input A for an amplified voltage difference UF from output voltage UA and reference current USOLL, an input B for a sinusoidal input voltage UE, and an additional input C for the input voltage peak UES or a phase shifted voltage value k×UES as a direct voltage value, whereby at output 52' a signal $$D = A \times B/C = UF \times UE/k \times UES$$

is produced.

The concept is characterized in that a value $I_s$ proportional to the output current IA can be measured in the input circuit, and the circuit's output circuit contains a voltage control circuit which regulates the output voltage and the amplified error difference with respect to the input circuit, i.e., the computer unit input, is reported back by means of a line. This makes it possible to use a concept, such as SEPIC, as a booster with or without potential isolation.

Measurement of the current IS in inductance coil D1.2 and its value $I_s$ equivalent to output current IA is taken advantageously using a shunt connected in series with the inductance coil D1.2. An additional advantage of the circuit configuration is the computer unit coupled in series with the voltage amplifier, which can result in an optimal PFC rating.

At constant power, the input current IE will increase at sinking input voltage UE. But as the current IS across the input voltage UE remains constant, the computer unit's output value D cannot change as the control value for the current IS. However, if the output value D is constant and the input value A is multiplied by the input voltage UE, the input voltage UE must be divided by the peak value of the input voltage as direct voltage value UES or K×UES. The quotient UE/UES is constant, i.e., independent of fluctuations of the input voltage. Alternatively, the average input voltage can also be fed to the input C as direct voltage.

Unlike the known state of the art, if input voltage UE drops, the current amplitude at the input will rise, and because, according to the state of the art, the input current IE is measured directly, value D must rise accordingly. According to the state of the art, this is divided by current UES square.

The presence of the condenser CS between input and output can limit current cut-off in the circuit at hand, whereby an inverse amplification factor on a buffer condenser CA, which must be subsequently transformed, does not take place at the output, or the condenser CA is charged by short-circuit current.

In one embodiment with potential isolation, the sinusoidal voltage is transformed into a hypothetical intermediate circuit above or below the input voltage.

This hypothetical intermediate circuit is transformed by the transformer using the transformation ratio Ü. Another advantage is the fact that when the power supply is switched on, a small condenser, i.e., the floating condenser CS, cuts in. The transformer then transforms the original buffer condenser of the two-phase topology at the output, although it is still rated at 100 (120) hertz. To obtain a low ripple factor, it (the capacitor) must be high capacitance though the CU product is easier to handle—because it has been shifted into the low-voltage range—than in the high-voltage circuit, especially as significantly better condensers are now available in this temperature and current range.

To also provide potential isolation in the control circuit, the voltage control is connected to the computer unit by a potential isolating transmission device such as an optical coupler.

According to a further embodiment, the control element contains at least two current sources to charge and discharge a condenser C1, and a comparator, whose input is connected to the condenser to measure the condenser voltage and whose output is connected to the power transistor and to switching elements such as diode gates which initiate the charging or discharging process to determine the t-on and t-off times independent of the output signal.

This embodiment also provides for a first power source on the input side connected with the current regulator across a resistor R1, to control the t-off time and on the output side connected to the condenser through a switching element, and that a second current source is connected to the input voltage UE across the resistor R2 to control the t-on time and, on the output side, connected with the condenser across the switching element S2 for charging. The result is a t-on control and a t-off control. The main purpose thereof is to use the input voltage to prevent the intermediate circuit and the output voltage from being subjected to dynamic fluctuations in the input voltage.

In this circuit configuration, the switch-off time t-off is constant at constant load. The condenser is always discharged in the same time. The turn-on time t-on must be set inversely proportional to the input voltage UE, that is, the lower the input voltage the longer the turn-on time t-on will be.

Furthermore, the problem of the invention is solved by a process for PFC rating a switching power supply whereby a computer unit is fed an amplified fault voltage UF consisting of the output voltage UA and desired voltage USOLL, and a voltage proportional to input voltage UE is, and reference current ISOLL is present at the output of the computer unit RG', which is compared to the actual current value IIST, to produce a drive signal for an electronic switch T. According to the invention, it is proposed that computer unit RG' be fed a peak UES or k×UES (independent of phase angle) of the input voltage UE and that the reference current value ISOLL is created as follows:

$$ISOLL = UF \times UE/k \times UES = UF \times UES|\sin \omega t|/k \times UES = UF \times k \times |\sin \omega t|$$

and that the actual current value IIST is essentially independent of fluctuations of the input voltages UE.

A further advantage is the input control of the t-on time over current levels 70, 72, the switch S2, and the condenser C1. Since t-on is ~1/UE, the t-on time of the power transistor T will increase with dropping input voltage, so that at constant t-off time the output voltage UA is controlled to a quasi constant value by the variable input voltage UE.

The problem of the invention is solved by magnetically coupling the second inductance coil D1.2 with the first inductance coil D1.1, and by providing the current regulator KI with a value proportional to the current IS measured in the second inductance coil D1.2 as an actual value, and an output of the current regulator KI or the voltage control KU is connected to a control unit whose output GA is connected to a control input G of the power transistor T.

The concept is characterized in that a value Is proportional to current IA can be measured in the circuit's input circuit and a voltage control circuit is connected to the circuit's output circuit, which controls the output voltage, and the amplified fault difference in the current regulator circuit belonging to the input circuit is reported back as a reference value using a transmission line. This makes it possible to use a power line regenerator concept with or without potential isolation. Another advantage is the fact that current acquisition, current difference, regulated quantity and the entire electronic system, control with monitoring, and control circuit are preferably at the same zero potential.

A particular advantage is the fact that the switching power supply has an extremely broad input voltage range (e.g., 4:1 to >10:1, e.g. 6V . . . 24 V to 0V . . . 158V) and fluctuations of supply voltage are regulated by the input control and the voltage control 46. The switching power supply according to the invention can be preset or adjusted to any input voltage (14.4V to 158V), preferably <3V to >110V without potential isolation.

The condenser CS is located between input and output. Its capacitance is inversely proportional to the clock frequency and can be used to limit the cut-in current of the circuit at hand, whereby the output condenser is not affected by inverse amplification factor or it charges the condenser CA controlled by short-circuit current (CA>>CA). CS consists of two condensers in series, preferably foil or ceramic condensers.

The circuit configuration at hand also insures that in case of a defective transistor T, the diode DE does not through connect to the output. The switching power supply therefore promotes output safety.

The measurement of the value equal to the current IS in the inductance coil D1.2 is made advantageously using a shunt in series with the inductance coil D1.2. The current IS and the equal value over the shunt is proportional to the output current IA. That means that a proportional value equal to the output current IA is available for current control.

According to the invention, the switching power supply can be used as a power regenerator for AC and DC supply systems subject to fluctuations and, in particular, for current and voltage supply, or as ballast for electrical loads such as power actuators, relays, contactors, current proportional throttles, and blowers. Batteries can also be initially charged advantageously, whereby the voltage control circuit is no longer needed and the current regulator circuit is replaced by an intelligent load IC. The switching power supply eliminates the referenced disadvantages of the state of the art. In particular, secure and stable output voltage and charging current is provided for widely fluctuating input voltages. This is especially true where the input voltage is either above or below the rated line voltage. The invention also insures that the output voltage can be regenerated, set, or adjusted to the rated line voltage.

A particular advantage is the fact that the adjusted output voltage UA or the output current IA can be set depending on the load, with $UA = k_U \times UAN$ and $IA = k_1 \times IAN$ with $k_U$, $k_1 > 0$ and up to >1 preferably $k_U$, $k_1 \cong 1$. In this varient circuit the switching power supply output can be adapted to any load. This means that in particular when supplying power to contactors, the switched contactor can be switched using low energy, i.e., reduced output voltage, e.g., $UA = \frac{2}{3}$ UAN, to lower power consumption of the contactor in a switched state. There is also a possibility of setting the input current of current proportional throttles so as to guarantee a swing proportional to the current or, in blowers, to change or control their volume.

A preferred version of the switching power supply according to the invention provides for the $k_U$, $k_1$ factor to be present as the reference value at the input of the control circuit and for said factor to be adjustable independent of load. In this version the $k_U$, $k_1$ factor can be programmed or set by switching contacts, resistance lines, or the like. For example, if all contactors are switched, the information concerning the contactor operating contacts can be fed to an evaluating circuit, in which, for example, the $k_U$ factor can be switched to $k_U = \frac{2}{3}$, in which the output voltage can be set to $UA = k_U \times UAN = \frac{2}{3} \times 24V = 16V$. Or the reference value can be set as an analogous value of 0–10V or 4–20 mA.

If loads are used with their own control circuit as is possible with current proportional throttles or linear drives or similar loads, the $k_U$, $k_1$ factor will take the form of a fault amplified signal from a heterodyne control circuit. This type of operation has the advantage of being able to optimally drive or regulate the connected loads.

The preferable range for the input voltage UE is between 4V AC $\leq$ UE $\leq$ 264V AC, and the output voltage in a range between 0V $\leq$ UA $\leq$ 110V, preferably 12, 24, 48, 60, 110V. The result is coverage of a broad range of requirements with a single circuit configuration. It is advantageous to set the output voltage UA in a range between UA $\geq$ 0V $\wedge$ UA $\geq$ UEmax $\leq$ $\wedge$ UA $\leq$ UEmin. The invention also provides for IA being constant for output voltage UA as the result of current IA and load resistance RA. That is, due to the circuit concept, the output current IA can be still be operated safely at an inductance LA, even at high resistance values RA, e.g., in dynamic situations. In this case, the fact that supply voltages lower and higher than the output value can be processed safely in addition to the constant and controllable output readings $k_U \times UAN$ or $k_1 \times IAN$ is a clear advantage.

Another suitable configuration of the switching power supply according to the invention provides for the voltage regulator KU to be connected in series to a computer unit RG' to make an output value D of the computer unit RG' available to the current regulator KI connected in series. This circuit model is especially envisioned for use of the switching power supply in AC supply networks. The computer unit is designed to contain an input for a sinusoidal input voltage and an additional input C for the peak value or the input voltage k×UES as a direct voltage value, whereby a signal D=A×B:C with B:C=UE:UES is generated at the output which is both constant and independent of UE. The control circuit thus becomes a power factor corrected control circuit. In ac operation, the switching power supply preferably has a form factor F closely approaching F=1. The angle of current flow is ideally corrected in a rectifier or in a transformer coupled in series.

At constant power, the input current IE falls with dropping input voltage. However, since the current IS is constant across the input voltage UE, the computer unit output value D should not change as the reference value for the current IS. If, however, the output value D is constant and the input value A is multiplied by the input voltage UE, the input voltage UE must be divided by the input voltage peak as the direct voltage value UES or K×UES. The quotient UE/UES remains constant, that is, independent of fluctuations in the input voltage UE. Unlike the known state of the art, the current amplitude at the input will rise at dropping input voltage UE, and since according to the state of the art the input current IE is measured directly, the value D must increase accordingly. According to the state of the art, the current is divided by UES square.

Further details, advantages, and features of the invention are not only taken from the claims deriving from these features alone or in combination, but also from the following description of a preferred embodiment taken from one of the figures.

DETAILED DESCRIPTION OF PREFERRED EMBODIMENTS

Figure 1:
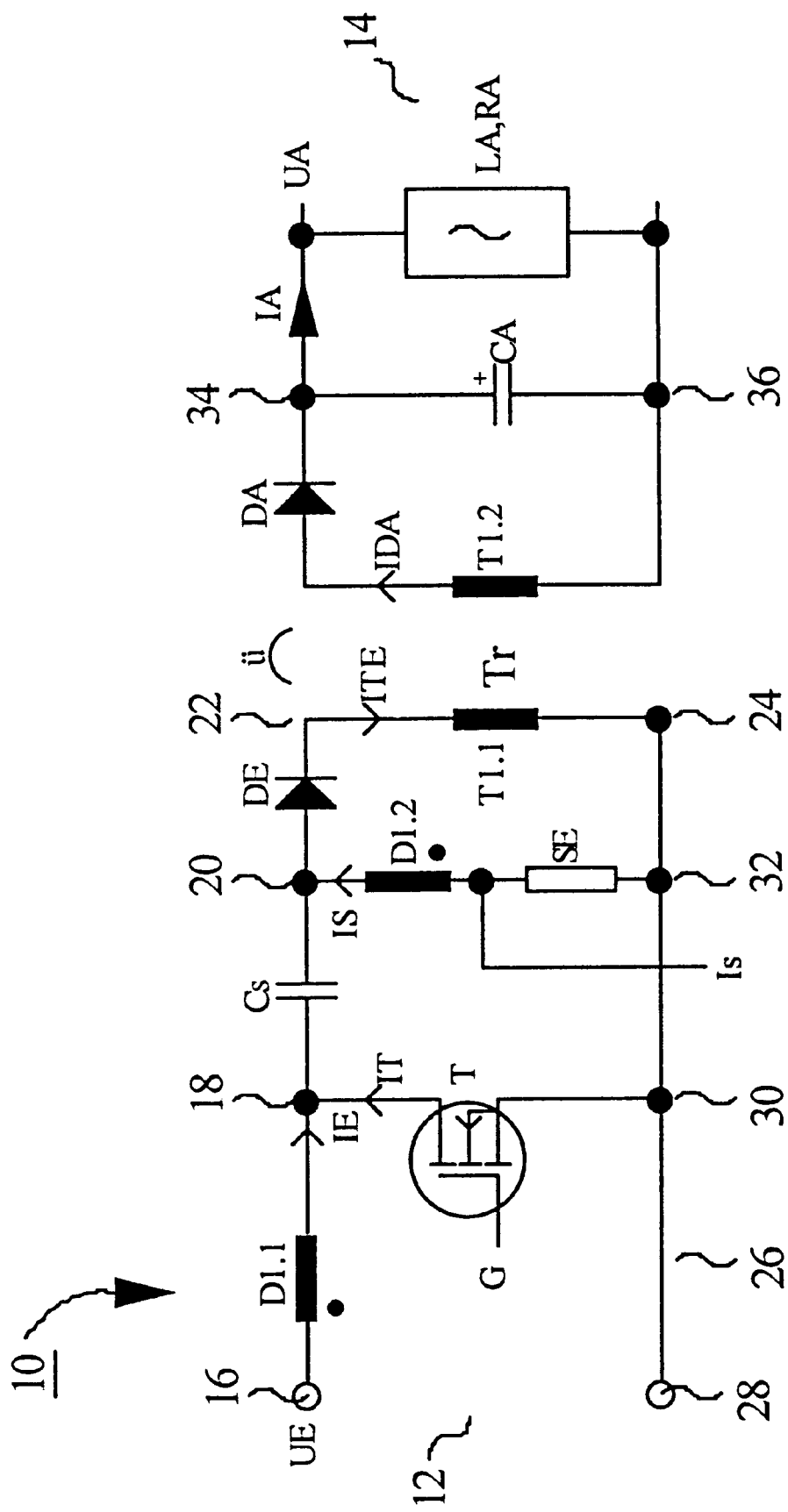
FIG. 1 is a circuit schematic of a modified booster (regenerator) with potential isolation.

FIG. 1 shows a switching power supply (10) with input circuit (12) and output circuit (14), whereby a transformer TR is provided with a primary winding T1.1 and a secondary winding T1.2 to isolate potential between input circuit (12) and output circuit (14). The transformer's turns ratio is Ü.

An input terminal (16) is connected to the first joint (18) by an inductance coil D1.1, which is in turn connected to a condenser CS nd the input of the primary winding T1.1 of the transformer TR through a second joint (20) and a diode DE with its cathode pin.

An output (24) of the primary winding T1.1 is connected to another input terminal (28) of the input circuit (12) by a lead (26).

Starting from the joint (18), a power transistor T is connected to a joint (30). Starting from the joint (20), a second induction coil D1.2, which is magnetically coupled with the first induction coil D1.1, is connected by a joint (32) to a resistance element such as shunt SE.

The output circuit (14) consists essentially of the secondary winding T1.2 of the transformer TR which is connected across a diode DA to the positive pole of a filter condenser CA via a joint (34). The secondary winding T1.2 is further connected to the minus pole of the load RA, LA. The load can be connected in parallel to the filter condenser CA and can scan the output voltage UA.

Figure 2:
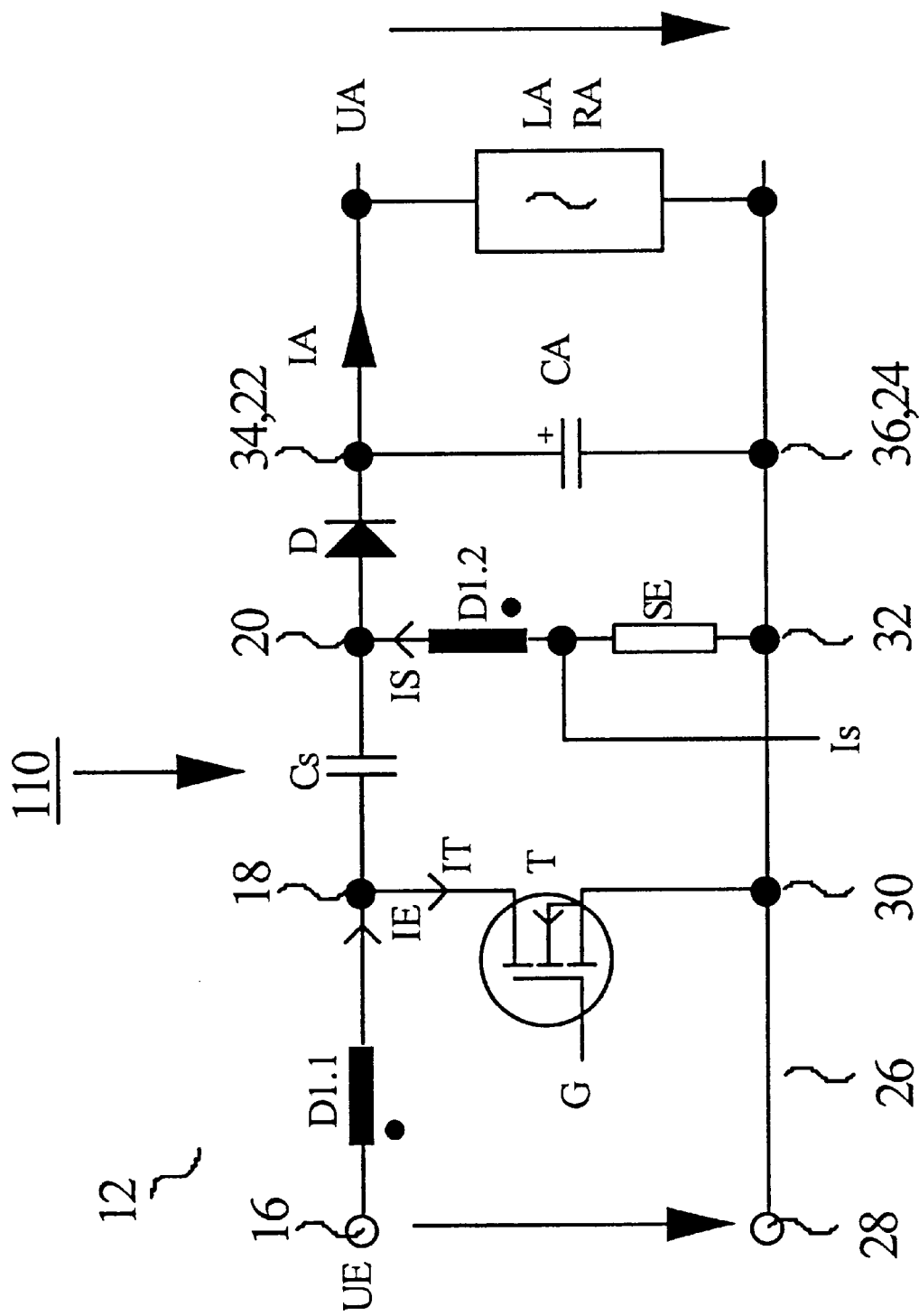
FIG. 2 is a circuit schematic of a modified booster (regenerator) without potential isolation.

FIG. 2 shows a switching power supply (110) without potential isolation, whereby the same components as in FIG. 1 have the same names and numbers. The switching power supply (110) does not have the transformer TR. Therefore, instead of the primary winding T1.1 with its contact points (22) and (24), the parallel connected filter condenser CA and load RA, LA are now connected to the input circuit (12) via joints (34) and (36).

Figure 3:
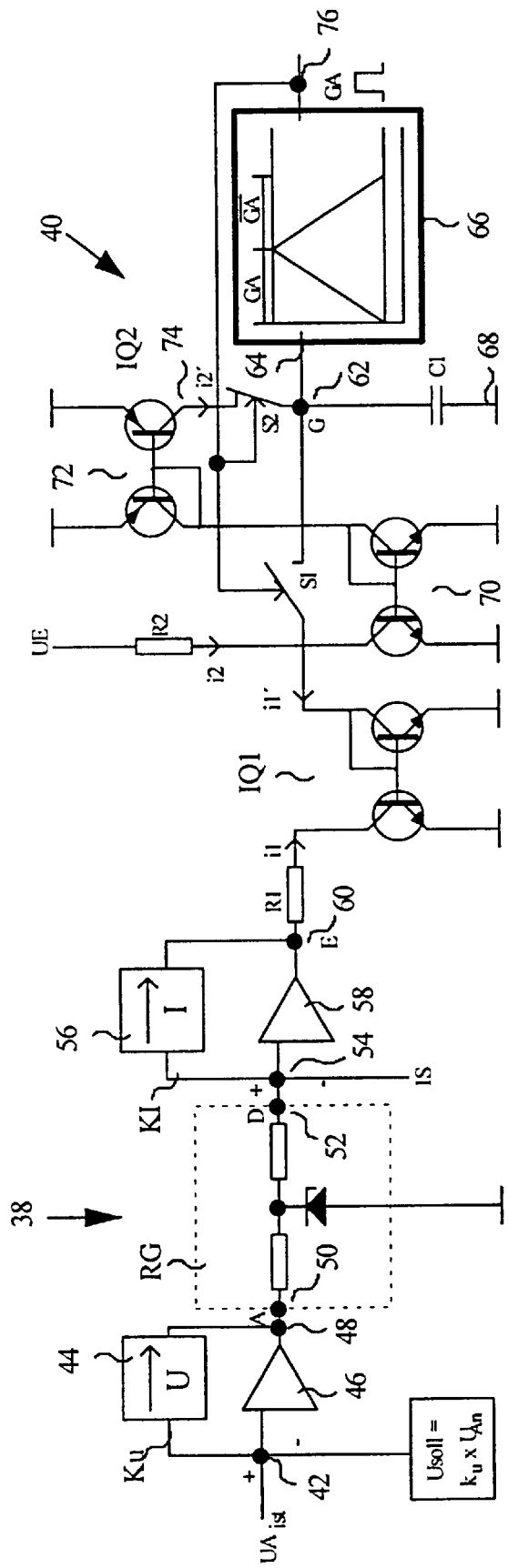
FIG. 3 is a control circuit diagram showing a configuration with a drive unit for the circuits shown in FIG. 1 and FIG. 2.

FIG. 3 is a schematic diagram of a control circuit configuration (38) with a control unit (40) coupled in series as a pulse-width modulated ("PWM") circuit. The control circuit consists of a voltage control KU, a computer unit RG, RG' coupled in series, and a current regulator KI coupled in series to the computer unit RG, RG'. On the input side, the voltage control KU has a comparator (42) which generates the amplified difference between the output voltage UA as an actual value, a reference voltage U-Soll=$k_U$×UAN as reference value, and an output signal fed back over the feedback element (44). This difference signal is fed to an amplifier (46) where it is amplified. The output (48) of the voltage control KU is connected to the input (50), (50') of the computer unit RG, RG'. An output (52), (52') of the computer unit RG, RG' is connected to a comparator (54) of the current regulator circuit KI. The output value of the computer unit RG, RG' serves as a reference current value for the current regulator circuit KI below. The comparator (54) compares the current reference value D of the computer unit RG, RG' with a value $I_S$ proportional to the output current IA measured on shunt SE and a feedback value fed across the feedback element (56). The compared value is fed to an amplifier (58), whereby a fault amplified current difference E from the current reference value $I_S$ (equal value), and current reference value D are available at an output (60) on the output side.

In the depicted embodiment, the control circuit configuration (38) is realized as a voltage control with a low frequency DC current regulator circuit KI. According to the invention, the reference voltage U-Soll is adjustable over a factor $k_U$, whereby the factor $k_U$ is either adjustable beforehand or load-dependent using switching contacts or resistance networks, or can be adjusted to an analogous value, or taken as the amplified fault difference of another heterodyne control circuit.

Alternatively, it is also possible to design the control circuit configuration (38) as a current regulator, whereby the current regulator KI functions as an input control circuit and is placed in series before the computer unit RG, RG'. The voltage control KU is placed in series after the computer unit RG, RG' as a low frequency control circuit. In this version as well, a reference current value I-Soll=$k_I$×IAN can be adjusted and fed to the current regulator over a factor $k_I$.

The output (60) of the current regulator KI is connected to a current source IQ1 across a resistor R1. Resistor R1 is connected on the output side to a contact point (62) of a condenser C1 and to an input (64) of a comparator circuit (66). The other free joint on the condenser C1 is connected to a housing (68).

Furthermore, the control unit (40) is connected to a second current source IQ2 across a resistor R2. The second current source (IQ2) consists of power levels (70), (72) and an output (74) connected across a switching element S2 to the condenser C1 or the input (64) of the comparator circuit (66). An output (76) of the comparator (66) is connected with a control input G of the power transistor T and with the control inputs of the switching elements S1 and S2.

The version of the computer unit RG represented in FIG. 3 is intended for a DC version of the power pack, that is, the input voltage UE is available as direct current (e.g., battery power). However, if the input voltage UE takes the form of sinusoidal half-wave, the computer unit RG is replaced by another version of the computer unit RG'.

Figure 4:
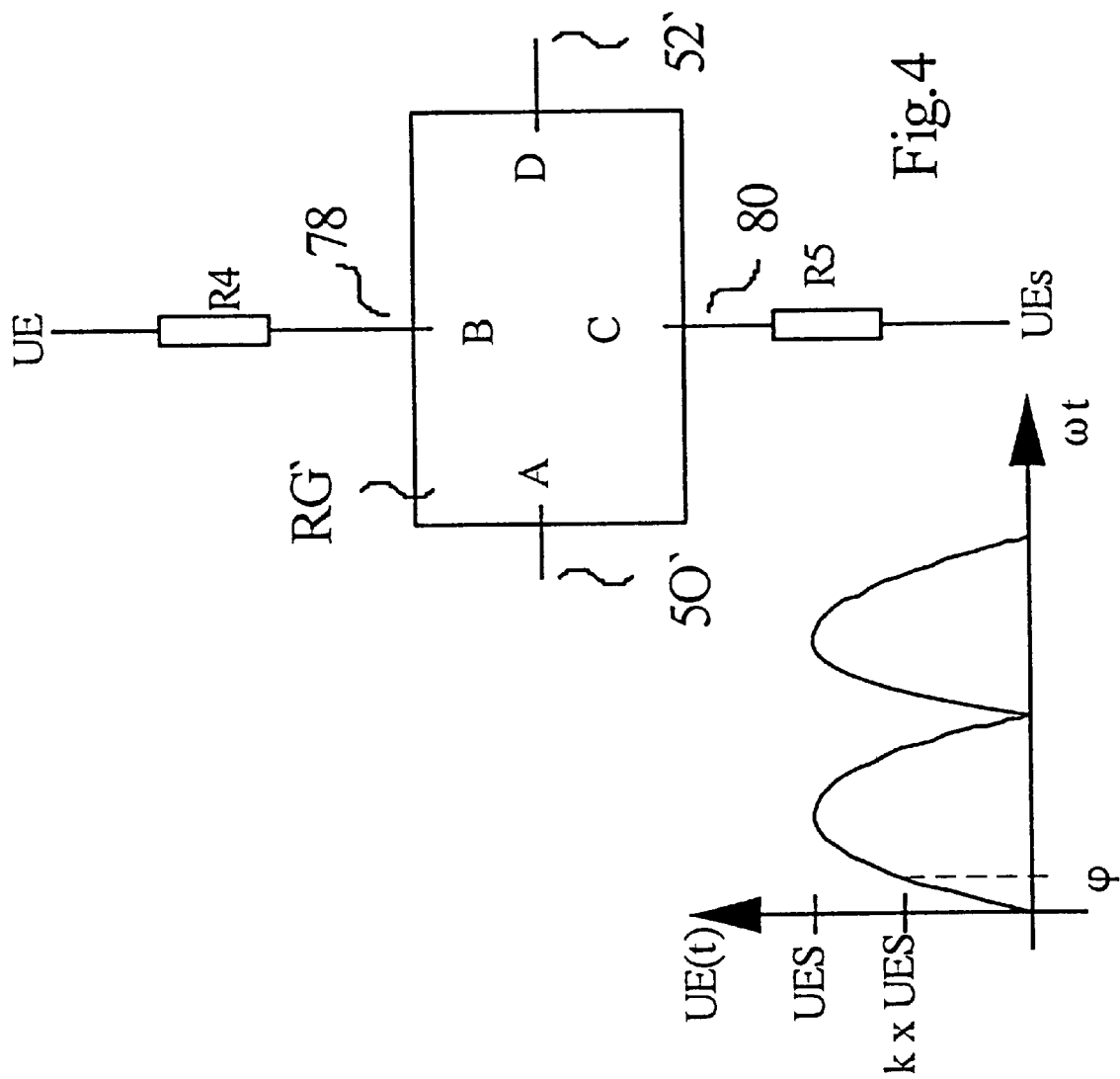
FIG. 4 is an illustration showing a variation of the computer unit for the control circuit in accordance with FIG. 2.

FIG. 4 shows the computer unit RG', connected by an input (78) to the input voltage UE across a resistor R4 and with an input (80) across a resistor R5 with the input peak voltage as direct current value UES. The output value D is calculated as follows:

$$D = A \times B / C = A \times UE / UES$$

where

A=Fault amplified voltage equaling the difference between actual value and control value B=UE=Full-wave rectified sinusoidal input voltage C=UES=Peak input voltage as direct current value or k×UES=UES×sin (Φ)

D=A×B/C=desired current value

The following is a more detailed description of the function of the switching power supply (10) through examples of rectified input voltages UE with sinusoidal half waves in a transient state. The closed transistor T is fed a current IE from the input voltage UE through the inductance coil D1.1 and the transistor T. The current IS, which equals IA over CS, is also fed through the transistor inductance coil D1.2 for the time $t_{on}$. In accordance with the turns ratio of the transformer TR, the primary current ITE=IE+IS is transformed to the output current IDA=IA for the time $t_{off}$.

In the transient state, the current IS through the inductance coil D1.2 will be the same or proportional to the output current IA. When the transistor is opened, the currents IE and IS will be conducted through the diode DE and the primary winding T1.1 or the transformer TR. The transformer TR acts as a current transformer, and with the turn ratio Ü, a 180° phase shifted current IDA=IA is induced in the secondary winding T1.1, which can flow across the diode DA into the load or into the condenser CA.

It is now possible to determine a DC magnitude (with respect to the transistor's switching frequency) which varies with the current IS over time across the circuit's input circuit with the shunt SE connected in series with the induction coil D1.2. The DC magnitude is available as an actual value for the control circuit configuration's (38) current regulator KI. It is crucial that the quasi DC value be equal or proportional to the output current IA.

The output current IA is fed to the voltage regulator KU as an actual value. A fault amplified voltage difference A between the actual value UA and the rated value UA-Soll is created in the voltage regulator KU output. In the described circuit configuration, that is with potential isolation, the output value of the voltage regulator KU is reported back to the input circuit, i.e., the input (50) or (50') of the computer unit RG' via a potential isolating transmission line (not shown) as an optical coupler.

At constant power, the input current IE will increase at dropping input voltage UE. However, since the current IS is constant across UE, the value D should not change as the rated value of the current regulator KI coupled in series. If, however, the output value D of the computer unit RG' is constant, UE must be divided by UES (input voltage peak values as direct voltage value or K×UES) since the input value A is multiplied by the alternating value UE. This quotient is independent of the input voltage, though it follows a unidirectional sine function. Connecting a simple computer unit in series to the input of the voltage regulator KU changes this circuit into a power-factor corrected (PFC) control circuit.

In other words, determine the voltage UA in the output circuit (14), compare it with a rated voltage U-Soll, amplify this control difference, conduct using lines such as optical couplers to the input (50') of computer unit RG', and multiply this value with the curve of the input voltage UE, which is produced by full-wave rectification and divided by UES. The output value D is also sinusoidal and is used as the reference value for the current regulator KI; this in turn is used by the comparator (54) to compare it with the DC value proportional to current IS as the actual value. The fault amplified current difference E between the actual value and the reference value is present at the output (60), which, in turn is used to the control turn off time t-off of the power transistor T.

A control signal GA is present at the control unit (40) of the output (76), thereby controlling the transistor T. At the same time, this control signal controls the switching elements S1, S2 which can be realized as diode gates. If the control signal GA is high, a condenser is charged with a current I2' inversely proportional to the input voltage UE. If the control signal GA is low, the switch S1 will be closed and the switch S2 opened, whereby the signal E (fault amplified current difference between rated and actual value) controls the discharge of condenser C1 through the current I1'.

Off time t-off is therefore constant under load. The condenser C1 is always discharged in the same time, i.e., in the time t-off. The turn-on time t-on is set inversely proportional to the input voltage UE, i.e., the higher the input voltage UE, the longer turn-on time t-on.

The turn on time t-on is controlled by the current source IQ2, whereby the input current I2 of this current source is proportional to the input voltage UE. Since the charging current I2'=I2 and is therefore proportional to the input voltage UE, the turn on time t-on is inversely proportional to the input voltage UE. The charging process takes place when the control signal GA at the comparator output (76) is high. If the control signal GA is low, the charging current I2' is turned off and the condenser C1 is discharged by the current regulator's output signal E through the current I1'.

According to the invention, the described switching power supply (10), (110) should be used as line regenerator REG for AC and DC supply networks subject to fluctuations and, in particular, as current and voltage supply for electrical loads such as relays, blowers, contactors (100), and current proportional throttles (102). These can be divided into two basic operating modes.

Figure 5A:
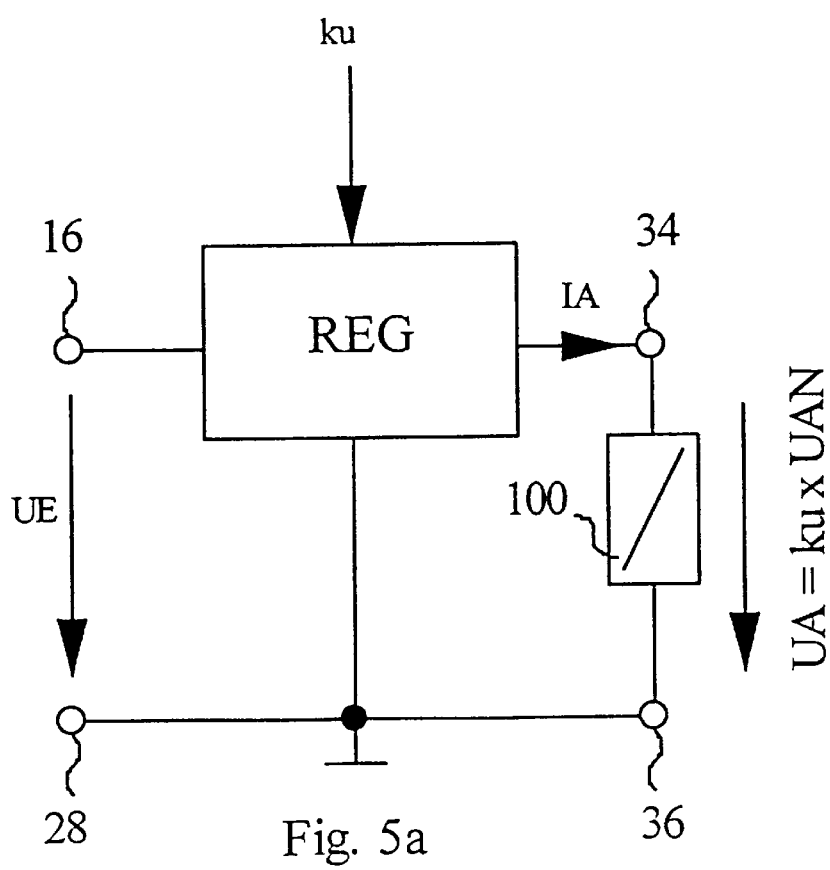
FIGS. 5a and b are an illustration showing a booster as a line regenerator in voltage mode.

In FIG. 5a, the regenerator REG is operated in voltage mode, i.e., the output voltage UA should be set at a constant value UA=$k_U$×UAN. This circuit variation is especially suited to supplying voltage to electrical loads such as contactors (100) or lead storage batteries. Using factor $k_U$, the output voltage UA can be adjusted to any value. According to the invention, the factor $k_U$ is adjustable independent of load. If, for example, all contactors connected in parallel to the regenerator REG output are switched on, the output voltage UA can be reduced using the $k_U$ factor from, for example, 24V to 16V. The power consumption of the contactors decreases in this "saver mode." If another contactor is switched on in this state, the voltage UA will be adjusted to the rated load voltage using the $k_U$ factor such that the additional contactor will switch on safely. After this, the system switches back to "saver mode."

Figure 5B:
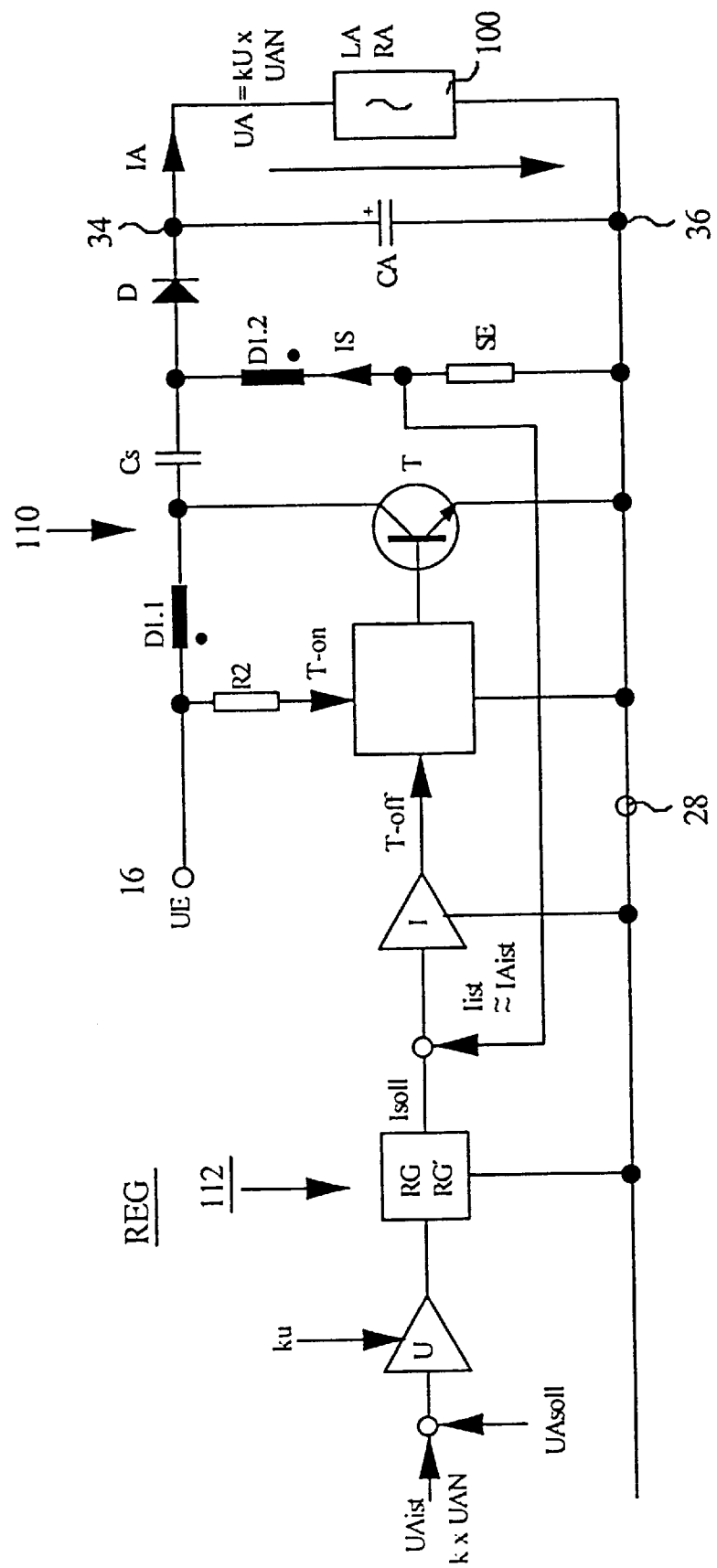

FIG. 5b represents an embodiment of the control circuit (112) to regulate the switching power supply (110). The control circuit (112) consists essentially of the same components as the control circuit 38, 40 in accordance with FIG. 3 described above.

Figure 6A:
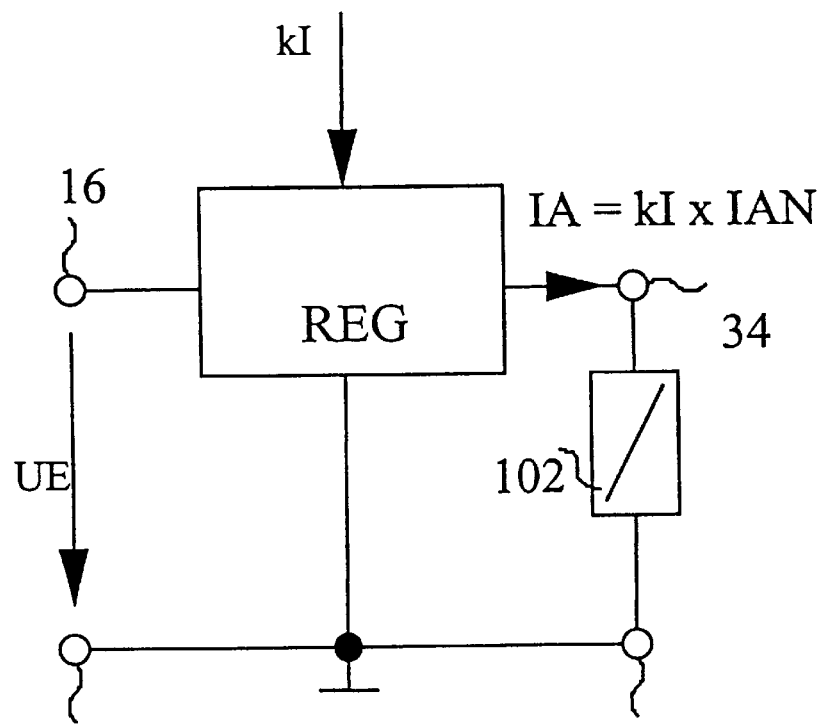
FIGS. 6a and b are an illustration showing a booster as a line regenerator in current mode.

FIG. 6a shows the regenerator REG in current mode, whereby the output current $IA=K_I \times IAN$ is adjustable over a wide range using the factor $K_I$. These circuit variants are used especially to regulate current proportional throttles (102) or charge NiCd batteries. It is possible to preset the output current IA using the $K_I$ factor so as to create a guaranteed swing of the current proportional throttles (102) proportional to the current. The $K_I$ factor can be programmed so that any current curve can be set, as for example, quick charging, charge retention, etc.

Figure 6B:
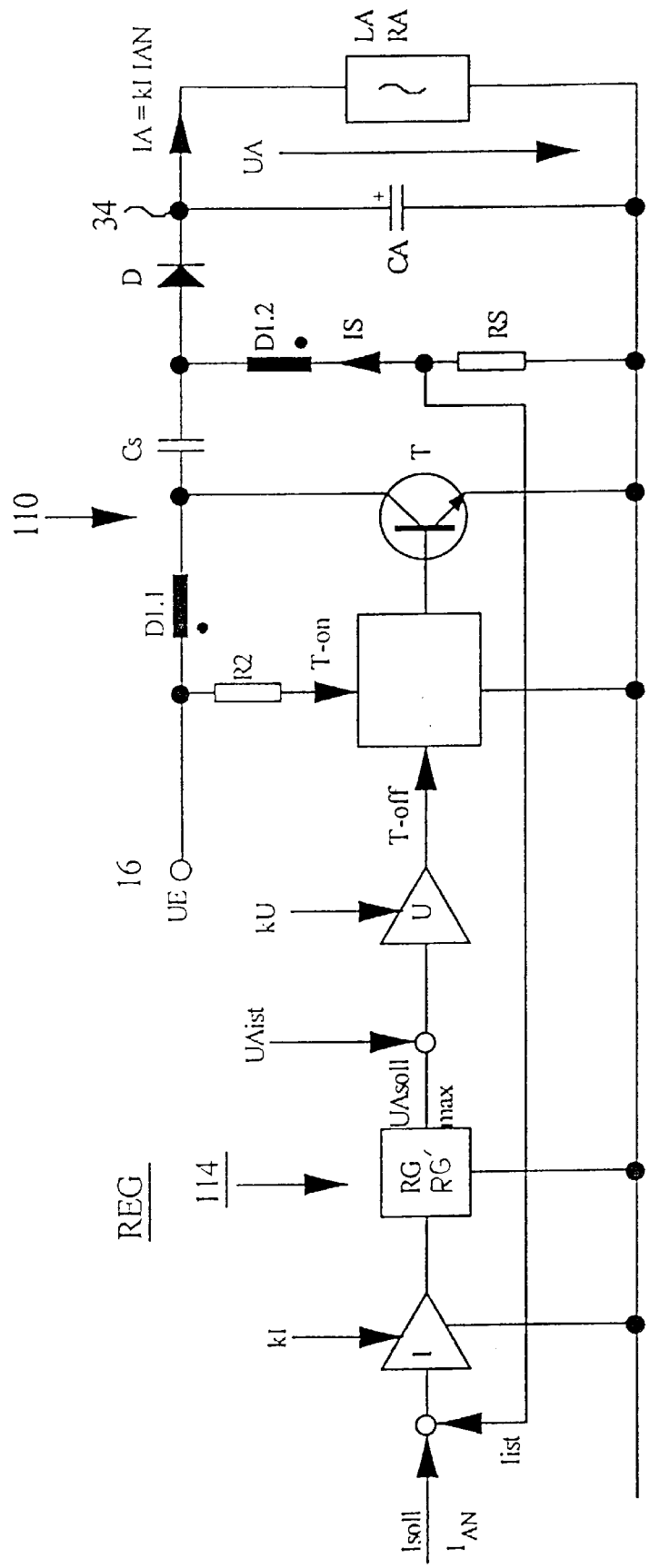

FIG. 6b shows a control circuit (114) for controlling the switching power supply (110) in the current mode. As indicated in FIG. 6b, an exchange of current and voltage controls occurs whereby the current regulator is placed before the computer unit RG, RG' and the voltage control is connected between the computer unit RG, RG' and the t-off/t-on control. In this configuration, the fault current created from a reference current ISOLL and actual current I1ST is fed to the current regulator after being amplified by an input of the computer unit RG, RG'. As mentioned, the $K_I$ factor can be adjusted as desired. A reference voltage value UA SOLL is available at the output of the computer unit RG, RG', which is compared to the actual voltage value UA 1ST at the output (34), and is then fed to the voltage control for amplification. This value is used to control t-off.

The control circuit is characterized by control of the input voltage, whereby the t-on time is controlled in inverse proportion to the input voltage UE, and the output value of the control circuit is used to control the t-off time.

The regenerator REG, contained in the switching power supply (10) or (110), can be used to regenerate an AC or DC power supply with a widely fluctuating input voltage UE. A particular advantage is the extremely broad input voltage range in the AC and DC line; for example, 18V DC/30V AC up to and including 264V AC/360V DC without commutation and theoretically up to 0V input voltage using the ideal circuit components T and DE/DA in FIGS. 1 and 2.

Operated using DC, the regenerator has a broad input voltage range (4:1 to 10:1, i.e., 4–38V, 14.4–158V). In its DC version, the regenerator REG can be adjusted to any input voltage UE, preferably in the range of $6.5V \leq UE \leq 158V$, and any output voltage UA, in the range between $0V \leq UA \leq 110V$ (with or without potential isolation).

Due to the above mentioned properties, the switching power supply is highly reliable and safe. In particular, it is suited for on-board rail and aircraft power supply applications and for supply networks for users interested in safety in the fields of power plants and, in particular, nuclear power plants.

The above descriptions of circuits and control circuits are merely examples, and are not intended to limit the theory according to the invention. Rather, the invention may be embodied in a large number of variations and versions. The control processes and the t-on input control with t-off control on which the explanations are based are also part of the invention.

I claim:

1. A SEPIC converter (10) with PFC rating for converting a sinusoidal input voltage (UE) into a constant output voltage (UA), which comprises:

an input circuit (12) comprising a first input terminal (16) and a second input terminal (28), said first and second input terminals being connected to the input voltage (UE);

an output circuit having a first output terminal (22) and a second output terminal (24) comprising a load (CA, RA, LA);

the input circuit (12) further comprising: a first inductance coil (D1.1), a condenser (CS), and an input diode (DE) connected in series via a first joint (18) and a second joint (20) and coupling the first input terminal (16) to the first output terminal (22); a lead (26) connecting the second output terminal (24) to the second input terminal (28); a power transistor (T) coupling the first joint (18) to the lead (26); and a second inductance coil (D1.2) magnetically coupled to the first inductance coil (D1.1) and coupling the second joint (20) to the lead (26); and a control circuit (38) comprising a voltage regulator (KU), a computer unit (RG') and a current regulator (KI) connected to an input of the power transistor (T), wherein the computer unit (RG') is coupled in series to the voltage regulator (KU) for PFC rating and an output value (D) of the computer unit (RG') is connected in series to the current regulator (KI) as a rated current value ($I_S$), the rated current value ($I_S$) being proportional to a current value (IS) measured in the second inductance coil (D1.2) of the input circuit (12), the computer unit (RG') further comprising a first input (A) for a voltage difference (UF) between the output voltage (UA) and a reference voltage (USOLL), a second input (B) for the input voltage (UE), and a third input (C) for a peak voltage value (UES) or a phase-shifted voltage value (k×UES) of the input voltage (UE) as a direct voltage, wherein the output value (D) is produced by the following equation:

$$D = A \times B / C = UF \times UE / k \times UES.$$

2. A SEPIC converter (10) according to claim 1, wherein the output circuit (14) is coupled to the input circuit (12) via a transformer having a primary winding (T1.1) and a secondary winding (T1.2), the primary winding (T1.1) being connected between the input diode (DE) and the lead (26), and the load (CA, RA, LA) being connected via an output diode (DA) to the secondary winding (T1.2).

3. A SEPIC Converter as set forth in claim 1, wherein the voltage regulator (KU) and the current regulator (KI) both provide input values to the control circuit (38), which can be adjusted independent of the load.

4. A SEPIC Converter as set forth in claim 1, wherein the voltage regulator (KU) and the current regulator (KI) are programmable or can be adjusted by means of switching contacts, resistance networks, or the like.

5. A SEPIC Converter as set forth in claim 1, wherein each of the signals from the voltage regulator (KU) and the current regulator (KI) are created as a fault amplified signal from a heterodyne control circuit.

6. A SEPIC Converter as set forth in claim 1, wherein the input voltage (UE) lies in the range of 4V to 158V and the output voltage (UA) lies in the range of 0V to 110V.

7. A SEPIC Converter as set forth in claim 1, wherein the output voltage (UA) is adjustable within a range between 0V to 110V.

8. A SEPIC Converter as set forth in claim 1, wherein, when operated using AC, the SEPIC converter (10) shows a form factor F close to F=1.

9. A SEPIC Converter as set forth in claim 1, wherein the input voltage (UE) may be in the range of 0V to 264V AC.

10. A SEPIC Converter as set forth in claim 1, wherein the voltage regulator (KU) is connected to the computer unit (RG, RG') via potential isolating transmission units such as optical couplers.

11. A SEPIC Converter as set forth in claim 1, wherein the SEPIC converter (10) and the control circuit (38) have a common potential.

12. A SEPIC converter set forth in claim 11, wherein the common potential is zero.

13. A SEPIC Converter as set forth in claim 1, further comprising a second control unit (40) having at least two current sources (IQ1, IQ2) to charge and discharge a condenser (C1) and a comparator (66) for measuring condenser voltage, wherein an output (76) of the second control unit is connected to the power transistor (T) and with a first switching element (S1) and a second switching element (S2) as diode gates, said first and second switching elements initiating the charging or discharging independent of the comparator (66) and initiate the charging or discharging process to determine the on or off times (t-on), (t-off).

14. A SEPIC Converter as set forth in claim 13, wherein the off time t-off can be regulated by an output value of the current regulator (KI).

15. A SEPIC Converter as set forth in claim 13, wherein one of the current sources (IQ1) is connected on an input side with the current regulator (KI) through a resistor ($R_1$) and on an output side to the condenser (C1) across the switching element (S1).

16. A SEPIC Converter as set forth in claim 15, wherein another of the current sources (IQ2) is connected on an input side with to the input voltage (UE) across a resistor ($R_2$) and, on an output side, to the condenser (C1) across a second switching element (S2).

17. A SEPIC Converter as set forth in claim 13, wherein the on time (t-on) is inversely proportional to the input voltage (UE).

18. A SEPIC Converter as set forth in claim 1, wherein the SEPIC converter regenerates starting at a minimum input voltage (UE)=0V.

19. A SEPIC converter (10), having particular application as a line regenerator or a battery charger, for converting a fluctuating input voltage (UE) into a constant output voltage (UA) or a constant output current (IA), which comprises:

an input circuit (12) comprising a first input terminal (16) and a second input terminal (28), said first and second input terminals being connected to the input voltage (UE);

an output circuit having a first output terminal (22) and a second output terminal (24), and comprising a load (CA, RA, LA);

the input circuit (12) further comprising: a first inductance coil (D1.1), a condenser (CS), and an input diode (DE) connected in series via a first joint (18) and a second joint (20) and coupling the first input terminal (16) to the first output terminal (22); a lead (26) connecting the second output terminal (24) to the second input terminal (28); a power transistor (T) coupling the first joint (18) to the lead (26); and a second inductance coil (D1.2) magnetically coupled to the first inductance coil (D1.1) and coupling the second joint (20) to the lead (26); and a control circuit (38) comprising a voltage regulator (KU), a computer unit (RG') and a current regulator (KI) connected in series, wherein an actual current value ($I_S$) proportional to a current value (IS) measured in the second inductance coil (D1.2) is input into the current regulator (KI), and an output (60) of the current regulator (KI) or the voltage regulator (KU) is connected to a control unit (40) having an output (GA) connected to a control input (G) of the power transistor (T).

20. A SEPIC Converter as set forth in claim 19, further comprising a measuring transducer (SE) coupled in series to the inductance coil (D1.2) as a shunt, wherein the actual current value ($I_S$) is a quasi DC value measured with the measuring transducer (SE) and is proportional to the output current (IA).

21. A SEPIC Converter as set forth in claim 19, wherein the output voltage (UA) or the controlled output current (IA) can be adjusted dependent of the load.

22. A process for PFC rating of a SEPIC converter for converting a sinusoidal input voltage (UE) into a constant output voltage (UA) comprising:

an input circuit (12) comprising a first input terminal (16) and a second input terminal (28), said first and second input terminals being connected to the input voltage (UE);

an output circuit having a first output terminal (22) and a second output terminal (24) comprising a load (CA, RA, LA) having an output inductance (LA) connected in parallel to an output condenser (CA);

the input circuit (12) further comprising: a first inductance coil (D1.1), a condenser (CS), and an input diode (DE) connected in series via a first joint (18) and a second joint (20) and coupling the first input terminal (16) to the first output terminal (22); a lead (26) connecting the second output terminal (24) to the second input terminal (28); a power transistor (T) coupling the first joint (18) to the lead (26); and a second inductance coil (D1.2) magnetically coupled to the first inductance coil (D1.1) and coupling the second joint (20) to the lead (26); and a control circuit (38) comprising a voltage regulator (KU), a computer unit (RG') and a current regulator (KI) connected to an input of the power transistor (T), wherein the computer unit (RG') is coupled in series to the voltage regulator (KU) for PFC rating and an output value (D) of the computer unit (RG') is connected in series to the current regulator (KI) as a rated current value ($I_S$), the rated current value ($I_S$) being proportional to a current value (IS) measured in the second inductance coil (D1.2) of the input circuit (12), the process comprising the steps of:
(a) feeding a fault voltage (UF) into a first input of the computer unit (RG'), the fault voltage comprising the output voltage (UA) and a desired voltage (USOLL);
(b) feeding a peak voltage value (UES) or a phase shifted voltage value (k×UES) from the input voltage (UE) into a second input of the computer unit (RG'), resulting in a rated current value (ISOLL) determined by the following equation:

$$ISOLL = UF \times UE / k \times UES$$

(c) outputting from an output of the computer unit (RG') the rated current (ISOLL) and a voltage proportional to the input voltage (UE); and (d) comparing the rated current (ISOLL) to an actual current value (IS) to create a drive signal for input into the power transistor (T), wherein the current (IS) is substantially unaffected by fluctuations of the input voltage (UE).

* * * * *